Feb. 29, 1944. A. DE HERTELENDY 2,342,793
AERIAL MINE
Filed March 19, 1941 2 Sheets-Sheet 1

Andor de Hertelendy,
INVENTOR
BY Victor J. Evans & Co.
ATTORNEYS

WITNESS

Feb. 29, 1944.  A. DE HERTELENDY  2,342,793
AERIAL MINE
Filed March 19, 1941  2 Sheets-Sheet 2
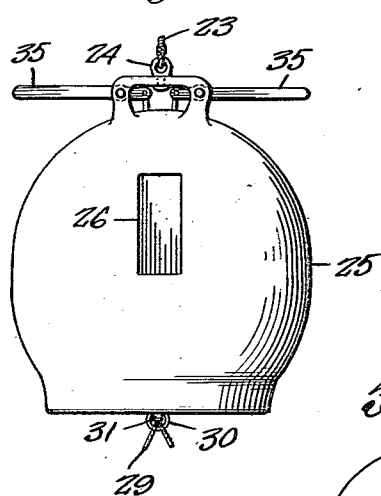
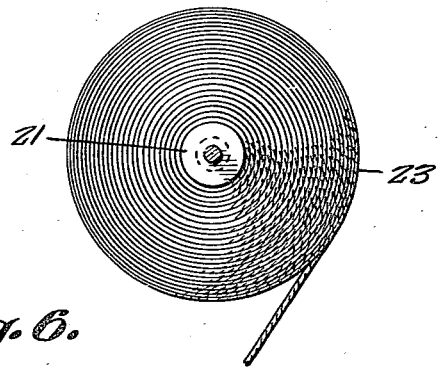
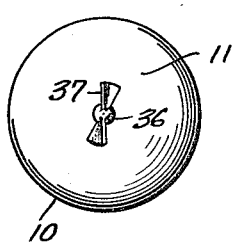
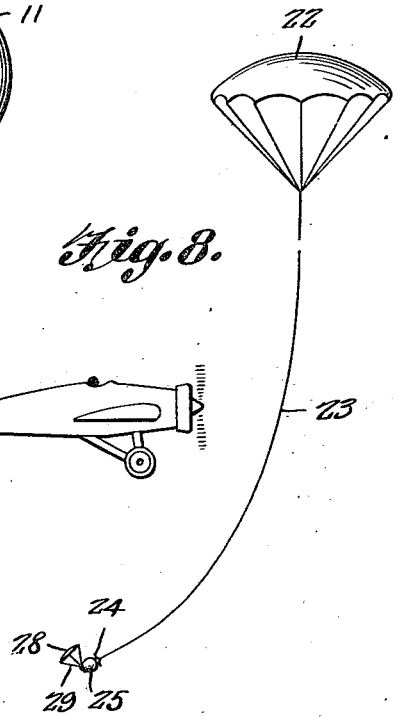
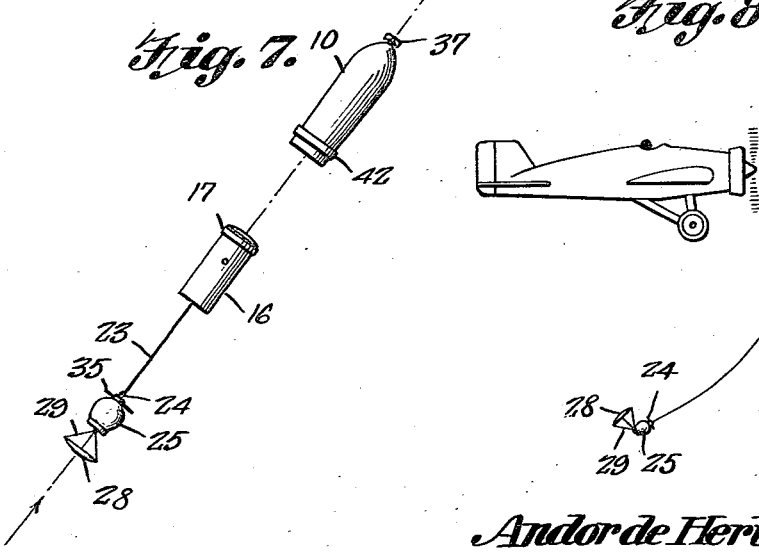
Andor de Hertelendy,
INVENTOR
BY Victor J. Evans & Co.
ATTORNEYS Patented Feb. 29, 1944

2,342,793

UNITED STATES PATENT OFFICE 2,342,793

AERIAL MINE

Andor de Hertelendy, Paris, France; vested in the Alien Property Custodian

Application March 19, 1941, Serial No. 384,215

9 Claims. (Cl. 102—63)

The invention relates to an exploding mine and more especially to an aerial mine or bomb.

The primary object of the invention is the provision of a mine of this character, wherein the same can be put in flight from a gun so that the mine can be suspended in the air and through impact from an aircraft will explode for the destruction of such aircraft, the mine being of novel construction and is sustained aloft in a novel manner.

Another object of the invention is the provision of a mine of this character, wherein the same is activated in a unique manner to dispose it into the path of an aircraft when in flight so that such mine will destroy the aircraft upon contact of such mine therewith, the mine being contained in a shell projected from a gun and such shell when sending the mine aloft arranged to become separated therefrom whereby through impact with an aircraft the said mine will be exploded for destructive purposes.

A further object of the invention is the provision of a mine of this character, wherein the construction thereof is such that destruction will be assured to aircraft when in flight, the mine being brought into contact with an aircraft through the instrumentality of a suspension element of a parachute which holds the mine aloft and in the path of the craft and such mine constructed to be exploded when aloft.

A still further object of the invention is the provision of a mine of this character, which is comparatively simple in its construction, thoroughly reliable and effective in its operation, positive in action, and comparatively inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 4 is an elevation of the mine proper.

Figure 5 is a fragmentary vertical transverse sectional view through the reel and the suspension cable or cord for the mine.

Figure 6 is an end elevation of the shell showing a propeller associated therewith.

Figure 7 is a side elevation showing the order of the separation of the shell from the carrier and the mine released from the latter when being put in flight.

Figure 8 is a side elevation of an aeroplane and the aerial mine identifying the positioning of the latter in the path of flight of said plane.

Similar reference characters indicate corresponding parts throughout the several views in the drawings.

Figure 1:
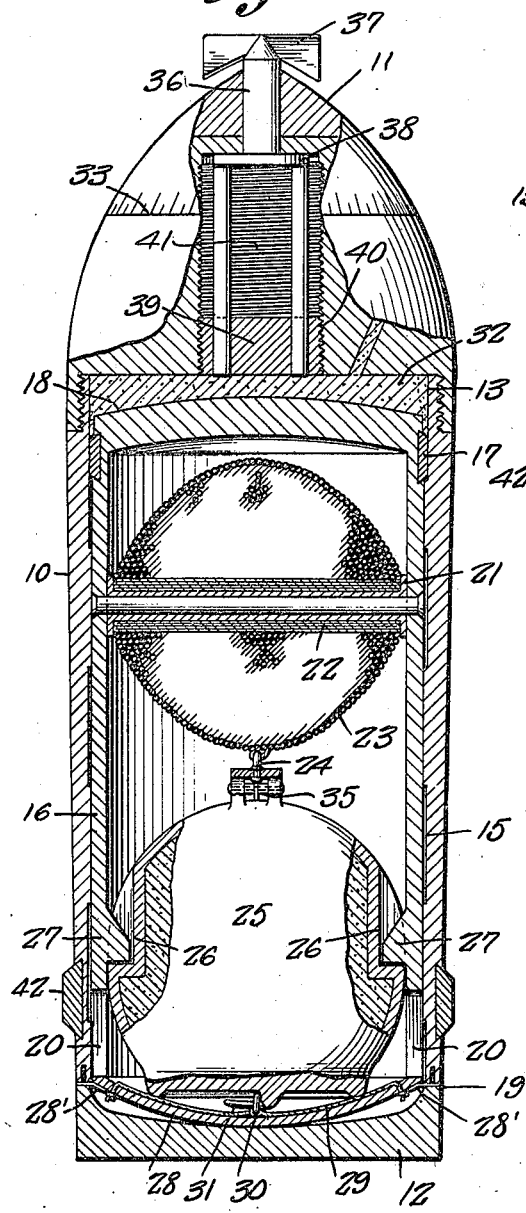
Figure 1 is a vertical longitudinal sectional view through a mine constructed in accordance with the invention.
Figure 2:
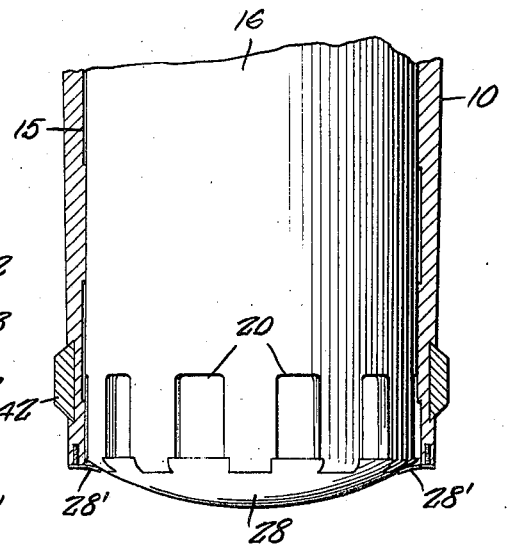
Figure 2 is a fragmentary vertical longitudinal sectional view through the shell for the mine showing in elevation the inner carrier for said mine.
Figure 3:
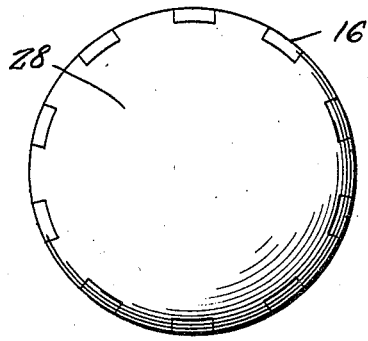
Figure 3 is an end elevation of the carrier with the closing cap fitted therewith.

Referring to the drawings in detail, the mine or bomb constituting the present invention comprises a projectile shell 10 preferably of bullet shape having a rounded outwardly tapered nose end 11 which closes the forward end of said shell, while the opposite tail end of this shell is open and temporarily closed by a wadding or guard 12. The shell 10 has formed interiorly thereof an explosive chamber 13. The wadding or guard 12 in its use is merely placed between the shell 10 and the firing charge within a gun (not shown) when the shell is fired therefrom for the sending or projecting of the same aloft. When the shell 10 leaves the gun this wadding or guard 12 becomes separated therefrom and falls to the ground so that the said shell when ascending has its open end 19 free of the wadding or guard.

Fitted within the chamber 13 in the shell 10 is a cylindrical carrier 16, the circular inner wall 14 of this chamber having rifling 15 while the said carrier 16 is fitted with a soft band 17 for the rifling 15 so that when the carrier is ejected from the shell 10 this carrier will be caused to spin outwardly through the open end 19 of the shell in conformity with the rifling 15 interiorly of the latter.

The carrier 16 has a closed end 18 while the other end thereof is open and is next to the open end 19 of the shell 10 when the carrier is fitted therein. This open end of the carrier 16 in the side wall of the latter is provided with air admitting windows 20, which are closed to the atmosphere when the carrier 16 has been pushed completely into the said shell 10 and these windows are for a purpose presently described.

Built within the carrier 16 next to its closed end 18 is a freshly rotatable spool 21 which normally has wound thereon a parachute 22. The floating cable or cord 23 of this parachute 22 is provided with a coupling 24 of a universal or swivel type and connects therewith an explosive body constituting a mine or bomb proper 25 to be exploded by percussion or contact with an object. The body of this mine or bomb proper 25 is preferably of partial spherical form although the same may be otherwise shaped and in this instance is provided at diametrically opposite points with notches 26 adapted to accommodate holding lugs 27 formed interiorly of the carrier 16 next to the open end thereof. When the carrier 16 has the mine or bomb proper 25 seated therein the latter will be held steady and be prevented from turning so that the parachute 22 with its cable or cord 23 wound upon the spool 21 will not become accidentally unwound as the said mine or bomb proper 25 will be prevented from rotating within the carrier or, in other words, rendered motionless as will be clearly apparent from Figure 1 of the drawings.

Separably fitting the open end of the carrier 16 is a concavo convexed shield or tail piece 28, it being separably retained in place by spring clips 28' mounted upon the open end of the carrier 16. This shield or tail piece 28 constitutes a temporary closure for the open end of said carrier 16 and has connected therewith cables or cords 29 carrying a coupling ring 30 which loosely fits onto a hook 31 formed at the base end of the mine or bomb proper 25. The purpose of this tail piece or shield 28 is to afford a temporary closure for the open end of the carrier 16 and to act as a pull medium when wind currents play against the same for extracting the carrier 16 from the shell 10 on the sending of the latter aloft. The wind currents are admitted through the windows 20 in the carrier 16 so that the moment the carrier 16 leaves the shell 10 a pulling activity is set up by the shield or tail piece 28 and the wind currents entering the windows 20 accelerate such pulling activity so that the mine or bomb proper 25 will be withdrawn from the carrier 16 and concurrently therewith the parachute will be let off from the spool 21 for the floating of the mine or bomb proper 25 aloft.

Normally the shield or tail piece 28 covers the open end of the carrier 16 when the latter has fitting within the shell 10 and will be protected by the wadding or guard 12 from damage through explosion occurring within the gun for the sending of the shell 10 therefrom and the delivery of the latter aloft. Within the chamber 13 is an explosive charge 32 which by a fuse 33, preferably of the timed variety, will be fired and in this manner the carrier 16 within the shell 10 after its projection from the gun will be delivered outside of the shell. Concurrently on the release of the carrier 16 from the shell 10 the shield or tail piece 28 is activated by air currents striking the same on admission through the windows 20 and thus the mine or bomb proper 25 will be withdrawn from the said carrier 16 and concurrently the parachute 22 will be unwound from the spool 21. In this manner the mine or bomb proper 25 will be set afloat above ground and such mine or bomb proper suspended from the parachute 22 by the cord or cable 23 while aloft.

In this instance the mine or bomb proper 25 has arranged therewith firing triggers 35 so that such mine or bomb will be exploded when either or both of the triggers make contact with an object.

Rotatably arranged in the nose end 11 at its central longitudinal axis is a stub shaft 36 constituting an arbor for a bladed propeller wheel 37, the said shaft 36 being joined with a rotatable feeder fork 38 for slidable connection with the follower 39 threaded at 40 in an auxiliary chamber or cell 41 which opens into the chamber 13 and the purpose therefor will be hereinafter fully described.

If found desirable the triggers 35 arranged with the mine or bomb proper 25 may be entirely dispensed with and such mine or bomb may be exploded in any other manner as, for example, by percussion or contact with an object, the impact therefrom being effected for explosive purposes.

The fuse 33, before the shell 10 is fired from the gun, is adjusted for the timing thereof as chosen corresponding to the distance of the gun at which a dismissal of the carrier 16 from the shell 10 shall take place. When the shell 10 is fired from the gun the explosive charge 32 is fired by the fuse 33 at the determined interval. This explosion effects the separation of the carrier 16 from the shell 10 and the latter falls to the ground. The shell 10 externally thereof is fitted with a soft band 42 for the rifling of the gun.

The purpose of the invention is the destruction of aircraft in flight by the use of the aerial mine or bomb and the latter is carried by a shell for the floating of such mine or bomb in the air and in the path of the aircraft and this floating is had by the hanging of the mine or bomb from a parachute which allows a slow descent of the mine or bomb to the ground. Any aircraft flying into the cable or cord 23 which suspends the mine or bomb will exert a pull on the cable or cord 23 which contacts with the aircraft causing such cable or cord to assume a U across the latter. By this pull the said cable or cord will be laid in the form of the U across the speeding craft, the momentum of the latter being imparted to the whole rigging and thus to the mine and parachute attached. The first result will be the upsetting of the manueuverability of the aircraft. Then the parachute will exert a great resistance against being pulled through the air by the aircraft and be almost at a standstill in the air. Thus in this manner as a consequence the said mine or bomb will reach the aircraft and become exploded by contact therewith resultant from impact on the body of the aircraft.

The shell 10 when projected from the gun will function similarly to the latter in that it will effect the delivery of the carrier 16 and retard the speed thereof and its contents. This carrier when let out from the shell 10 will receive a twist through the instrumentality of the soft band 17 and the rifling within the shell 10 and this twist will neutralize the twist imparted to the whole shell by the gun. As a consequence, the shell 10 will fly forward at a greater speed than the carrier 16 when leaving said shell and in this manner reach the ground separately.

Now the carrier 16 with its contents flies at a speed greatly reduced by the explosion of the charge 32 in the shell 10. The shield or tail piece 28 which is temporarily held by the clips 28' on explosion of the charge 32 for the separation of the shell 10 and the carrier 16 will be exposed to air currents entering the windows 20 and such shield or tail piece will separate from the carrier 16 and through the connections 29 which then become taut a pull will be exerted on the mine or bomb 25 to extract it from the carrier 16. The mine or bomb 25 in turn will transmit a pull on the cable or cord 23 causing a rotation of the reel 21 in such manner that the parachute 22 will be withdrawn from the carrier 16. The carrier 16 continues to fly forward and after the complete unwinding of the cable or cord 23 from the reel and likewise the parachute therefrom the latter will come out of contact with the mine or bomb and such parachute will open for the floating of the latter in the air. The strength of the powder charge 32, the size of the chamber 13 and the weight and the shape of the carrier 16, the mine or bomb 25, the cable or cord 23 and the tail piece 28 must be chosen in such a way that by the time the parachute comes off the reel the tail piece 28 and the mine or bomb 25 will have lost their speed toward the point at which this separation takes place. These should begin to exert a slight retarding pull on the parachute 22 through the cable or cord 23. This pull will open the parachute. In order to achieve this the speed of the carrier 16 and its contents after the explosion of the charge 32 should be the same regardless at what part of the shell's ascent trajectory the explosion takes place. Thus the descent of the shell's speed must be counterbalanced. This is taken care of by the action of the propeller 37 on the follower 39 which forms part of the wall of the chamber 32 in that as the shell moves through the air the propeller 37 will turn for actuating the follower 39 to increase the chamber 13 through the cell 41, thereby reducing the driving power of the charge 32 in the same measure as the speed of the shell decreases.

After the parachute 22 has opened the mine or bomb 25 will be forced by gravity to occupy a point perpendicularly below the parachute 22 but before becoming passive in this position it will assume a pendulum-like swing therethrough. In this swinging motion the tail piece 28 will lag behind and become detached from the mine or bomb 25 by the ring 30 slipping from the hook 31 whereupon this tail piece falls to the ground. Now the mine or bomb 25 held aloft by the parachute 22 will slowly descend to earth and is in position for action in event that the cable or cord 23 is struck by an aircraft and through contact of the mine or bomb with the craft the said mine or bomb becomes exploded and in this fashion destroying such craft.

The swivel coupling 24 serves the purpose of preventing kinks forming in the cable or cord 23 should the countertwist given to the carrier 16 be too strong or insufficient.

What is claimed is:

1. A mine comprising a projectile body having an explosive chamber therein, open at one end, a carrier separably held by said body, a parachute releasably held within said carrier, an explosive bomb connected with said parachute and releasably seated within said carrier, a time fuse explosive charge in said body for ejecting said carrier from said projectile body during flight, air current operated means for extracting said bomb and parachute from said carrier after said carrier is released from said body and means for temporarily closing the open end of said body to protect the contents thereof while the body is being projected from a gun.

2. The mine as claimed in claim 1 wherein means is provided for gradually lessening ejecting force due to the explosion of said charge, in proportion to the distance along the path of flight that the projectile has traveled to the time of explosion.

3. The mine as claimed in claim 1 wherein means is provided for progressively increasing the volume of said explosion chamber during flight whereby the ejecting force due to the explosion of said charge is gradually lessened in proportion to the distance along the path of flight that the projectile has traveled to the time of explosion.

4. The mine as claimed in claim 1 wherein air impeller actuating means is provided for progressively increasing the volume of said explosion chamber during the flight whereby the ejecting force of the explosion of said charge is gradually lessened in proportion to the distance along the path of flight that the projectile has traveled to the time of explosion.

5. The mine as set forth in claim 1 wherein said carrier is formed with an open end with adjacent side openings and said means for extracting said bomb and parachute includes a shield connected to said bomb and releasably held at the open end of the carrier whereby on release of said carrier, air currents entering said carrier through said side openings, release said shield and said shield pulls said bomb and parachute out of said carrier.

6. A mine comprising a projectile, a carrier, releasably held in said projectile, an explosive bomb within the carrier, a parachute connected with said bomb and held in said carrier, means for ejecting said carrier from said projectile, controlling means associated with said last means for causing the speed of ejection to be approximately proportional to the speed of the projectile at the time of ejection and means operable on ejection of said carrier for removing said bomb and parachute from said carrier.

7. The mine claimed in claim 6 wherein said first named means is an explosive charge contained in a chamber in the projectile and said controlling means comprises a movable wall of said chamber and an air actuated impeller operatively connected with said wall for moving the same during flight to increase the volume of said chamber.

8. The mine as claimed in claim 6 wherein a long cord is provided attached at its ends to said bomb and parachute respectively and the carrier contains a reel on which the cord and parachute, when in the carrier, are wound.

9. In a structure of the kind described, a projectile, a releasable bomb in said projectile, a parachute in said projectile connected to said bomb, means for applying a force for ejecting said bomb and parachute from said projectile, said means including means for controlling the ejecting force so that it is approximately proportional to the speed of the projectile at the moment of ejection.

ANDOR DE HERTELENDY.